United States Patent
Badrinath et al.

(10) Patent No.: US 12,007,881 B2
(45) Date of Patent: Jun. 11, 2024

(54) METHOD FOR POPULATING SPANNER DATABASES IN TEST ENVIRONMENTS

(71) Applicant: Google LLC, Mountain View, CA (US)

(72) Inventors: Srinath Badrinath, Karnataka (IN); Everett Maus, Seattle, WA (US); Danhao Guo, San Mateo, CA (US); Carlos Arguelles, Edmonds, WA (US)

(73) Assignee: Google LLC, Mountain View, CA (US)

( * ) Notice: Subject to any disclaimer, the term of this patent is extended or adjusted under 35 U.S.C. 154(b) by 234 days.

(21) Appl. No.: 17/555,659

(22) Filed: Dec. 20, 2021

(65) Prior Publication Data

US 2023/0195605 A1    Jun. 22, 2023

(51) Int. Cl.
G06F 11/36    (2006.01)

(52) U.S. Cl.
CPC ...... G06F 11/3688 (2013.01); G06F 11/3684 (2013.01); G06F 11/3696 (2013.01)

(58) Field of Classification Search
CPC ............. G06F 11/3684; G06F 11/3688; G06F 11/3696
See application file for complete search history.

(56) References Cited

U.S. PATENT DOCUMENTS

| | | | |
|---|---|---|---|
| 6,701,514 B1* | 3/2004 | Haswell | G06F 11/3664 717/124 |
| 9,514,164 B1 | 12/2016 | Matic et al. | |
| 2006/0123009 A1* | 6/2006 | Bruno | G06F 16/217 |
| 2007/0078825 A1* | 4/2007 | Bornhoevd | G06F 11/3409 |
| 2009/0309770 A1* | 12/2009 | Andreev | H03M 13/6525 341/81 |
| 2011/0055237 A1* | 3/2011 | Veanes | G06F 16/33 707/E17.062 |
| 2015/0178366 A1* | 6/2015 | Farahbod | G06F 16/217 707/603 |
| 2015/0309919 A1* | 10/2015 | Correll | G06F 11/3684 714/38.1 |

(Continued)

FOREIGN PATENT DOCUMENTS

CN    113434388 A    *    9/2021

OTHER PUBLICATIONS

Introducing Cloud Spanner: A global databaseservice for mission-critical applications by Srivastava Feb. 14, 2017 https://cloud.google.com/blog/products/gcp/introducing-cloud-spanner-a-global-database-service-for-mission-critical-applications (Year: 2017).*

(Continued)

Primary Examiner — Joseph O Schell
(74) Attorney, Agent, or Firm — Lerner David LLP

(57) ABSTRACT

A method of populating a test environment for integration testing of a production database. The production database includes a plurality of tables, and may be represented by a directed acyclic graph (DAG), in which each of the plurality of tables is represented by a respective node of the DAG and schema-level constraints of the plurality of tables are represented by edges of the DAG. The method may involve constructing the DAG, topologically ordering the plurality of tables of the production database according to the DAG, randomly generating test data in accordance with the schema-level constraints of the plurality of tables, and populating the randomly generated test data to the test environment according to the topological ordering of the plurality of tables.

22 Claims, 4 Drawing Sheets

(56) References Cited

U.S. PATENT DOCUMENTS

| | | | |
|---|---|---|---|
| 2016/0092545 A1* | 3/2016 | Shivarudraiah | G06F 16/278 707/600 |
| 2016/0125111 A1* | 5/2016 | Yu | G06F 30/3323 716/106 |
| 2017/0091082 A1* | 3/2017 | Ooshima | G06F 16/21 |
| 2017/0118083 A1* | 4/2017 | Bjorner | H04L 45/02 |
| 2019/0146998 A1* | 5/2019 | Jin | G06F 9/4881 718/104 |
| 2022/0107893 A1* | 4/2022 | Benisty | G06F 12/0868 |

OTHER PUBLICATIONS

Machine generated translation of CN-113434388-A, retrieved Feb. 9, 2024 (Year: 2024).*

International Search Report and Written Opinion for International Application No. PCT/US2022/053497 dated Apr. 14, 2023. 12 pages.

Corbett, et al., Spanner: Google's Globally-Distributed Database, Published in the Proceedings of OSDI, 2021, 14 pages.

* cited by examiner

METHOD FOR POPULATING SPANNER DATABASES IN TEST ENVIRONMENTS

BACKGROUND

Integration testing for a database, such as a production database, can test the interaction between the database and various services and applications that interact with the database. This may be necessary to ensure proper integration between the database and one or more other interacting components, and may be performed for each new release of the interacting components.

Typically, in order to facilitate the testing, data is copied over from the production database to a separate test environment. However, if the production database stores a large amount of production data, the copying process can be wasteful, since only a fraction of the production data may be needed in order to test integration. Furthermore, if a new service or application is being tested, the production database may not yet include any production data or enough production data to conduct the testing, making the copying process impossible altogether. Additionally, introducing the production data to the test environment raises security and privacy concerns.

BRIEF SUMMARY

The present disclosure utilizes the abstraction layers of the production database to generate test data and to systematically divide assignments to generate the test data into approximately even or balanced portions to be generated and written to the test environment in parallel to one another.

An aspect of the disclosure is directed to a method of populating a test environment for testing of a production database comprising a plurality of tables, the method involving: constructing, by one or more processors, a directed acyclic graph (DAG), wherein each of the plurality of tables is represented by a respective node of the DAG and schema-level constraints of the plurality of tables are represented by edges of the DAG; topologically ordering, by the one or more processors, the plurality of tables of the production database according to the DAG; randomly generating, by the one or more processors, test data; and populating, by the one or more processors, randomly generated test data that satisfies the schema-level constraints of the plurality of tables to the test environment according to the topological ordering of the plurality of tables.

In some examples, the schema-level constraints of the plurality of tables may include both foreign keys and interleaving, and the topological ordering may be based on both the foreign keys and the interleaving.

In some examples, the test data may be generated by one or more data generators, each including a satisfiability modulo theories (SMT) solver for determining, for a given table of the plurality of tables, whether the randomly generated data satisfies a data type and the schema-level constraints of the given table.

In some examples, the one or more data generators may be a plurality of independent platform agnostic data generators operating in parallel.

In some examples, the method may further include: for each table of the plurality of tables, splitting, by the one or more processors, the table into a plurality of key ranges according to a plurality of key values, each generated key value being a split point, generating, by the one or more processors, a work pool comprising a plurality of work units, each work unit associated with a respective table of the plurality of tables and a respective key range of the plurality of key ranges, and assigning, by the one or more processors, the plurality of work units to the plurality of data generators.

In some examples, splitting the table into a plurality of key ranges may include: for each table of the plurality of tables, estimating, by the one or more processors, a number of bytes-per-row of the table, and determining, by the one or more processors, a balanced distribution of key ranges based on a number of rows to generate and the estimated number of bytes-per-row of each table.

In some examples, the method may further include: determining, by the one or more processors, an amount of data to populate each table of the test environment with, and determining, by the one or more processors, a number of the plurality of key values based at least in part on the determined amount of data.

In some examples, the method may further include: for a given table of the plurality of tables, determining, by the one or more processors, one or more data constraints based on data contained in the given table, and constraining, by the one or more processors, the randomly generated test data for a corresponding table of the test environment based on the one or more data constraints.

In some examples, the one or more data constraints may include at least one of a dataset range, a dataset distribution, and a number of unique dataset elements.

In some examples, the method may further include writing the randomly generated test data to a mutation pool associated with a given table of the test environment, and in response to a size of a transaction of the mutation pool's contents to the given table of the test environment meeting or exceeding a threshold transaction value, flushing the mutation pool.

Another aspect of the disclosure is directed to a system for populating a test environment for testing a production database comprising a plurality of tables, the system including: memory storing a representation of a directed acyclic graph (DAG), wherein each of the plurality of tables is represented by a respective node of the DAG and schema-level constraints of the plurality of tables are represented by edges of the DAG; and one or more processors configured to: topologically order the plurality of tables of the production database according to the DAG, randomly generate test data in accordance with the schema-level constraints of the plurality of tables, and populate the randomly generated test data to the test environment according to the topological ordering of the plurality of tables.

In some examples, the schema-level constraints of the plurality of tables may include both foreign keys and interleaving, and the one or more processors may be configured to topologically order the plurality of tables based on both the foreign keys and the interleaving.

In some examples, the one or more processors may be configured to generate the test data using a satisfiability modulo theories (SMT) solver for determining, for a given table of the plurality of tables, whether the randomly generated data satisfies a data type and the schema-level constraints of the given table.

In some examples, the one or more processors may be configured to randomly generate the test data using a plurality of SMT solvers operating in parallel.

In some examples, the one or more processors may be configured to, for each table of the plurality of tables, split the table into a plurality of key ranges according to a plurality of key values, each generated key value being a split point, generate a work pool comprising a plurality of work units, each work unit associated with a respective table of the plurality of tables and a respective key range of the plurality of key ranges, and assign the plurality of work units to the plurality of data generators.

In some examples, the one or more processors may be configured to, for each table of the plurality of tables, estimate a number of bytes-per-row of the table, and determine a balanced distribution of key ranges based on a number of rows to generate and the estimated number of bytes-per-row of each table.

In some examples, the one or more processors may be configured to determine an amount of data to populate each table of the test environment with, and determine a number of the plurality of key values based at least in part on the determined amount of data.

In some examples, the one or more processors may be configured to, for a given table of the plurality of tables, determine one or more data constraints based on data contained in the given table, and constrain the randomly generated test data for a corresponding table of the test environment based on the one or more data constraints.

In some examples, the one or more processors may be configured to write the randomly generated test data to a mutation pool associated with a given table of the test environment, and in response to a size of a transaction of the mutation pool's contents to the given table of the test environment meeting or exceeding a threshold transaction value, flush the mutation pool.

In some examples, the production database may be a Spanner database.

DETAILED DESCRIPTION

Overview

Figure 1:
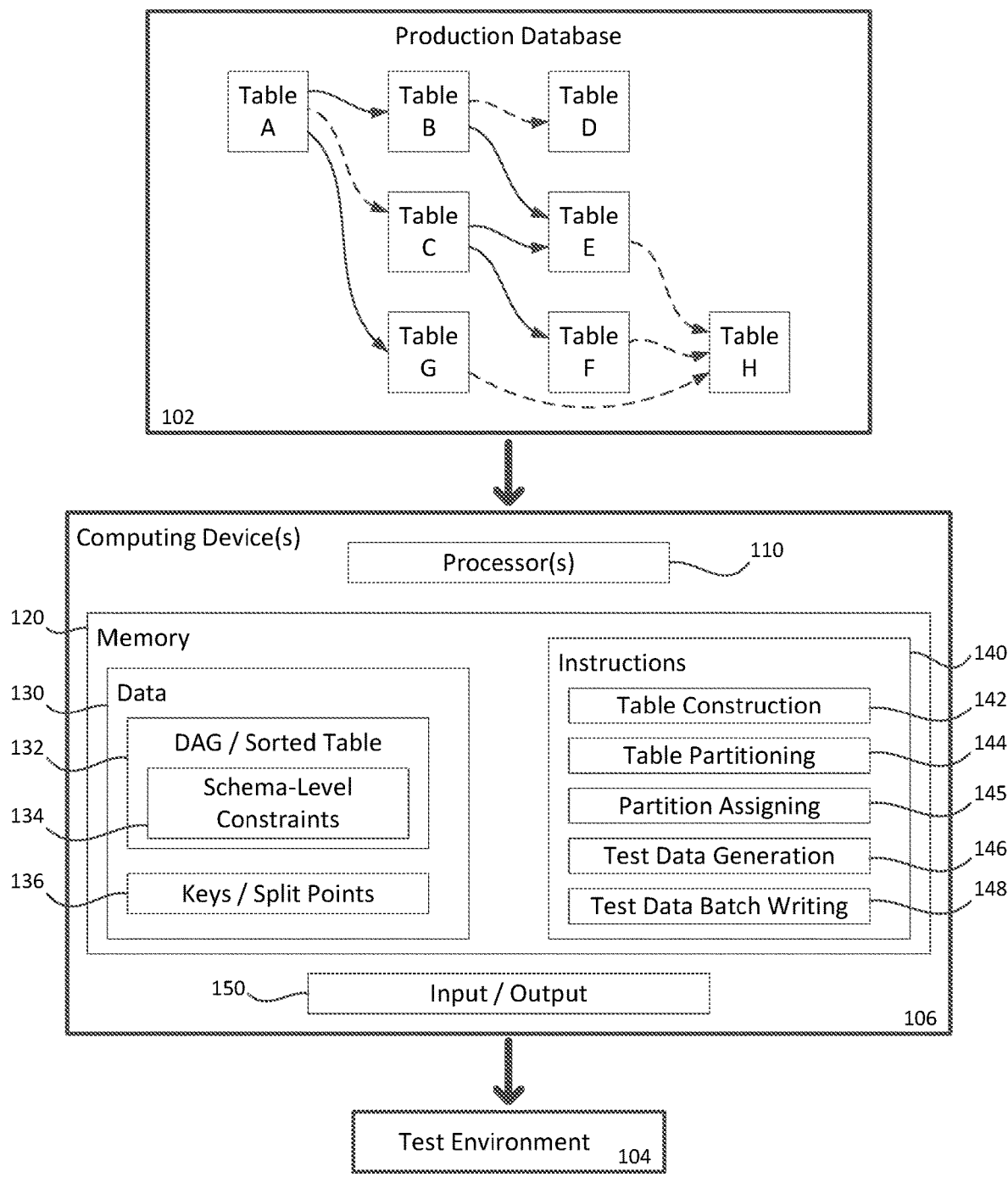
FIG. 1 is a block diagram of an example system in accordance with an aspect of the present disclosure.

The present disclosure provides various methods and techniques for populating a test environment with randomly generated production data. This avoids the need to copy production data from the production database. The methods leverage the abstraction layers of the production database to generate test data that is a high fidelity representation of the production data. This is accomplished by building a directed acyclic graph (DAG) from the tables of the production database, whereby each respective table represents a node of the DAG, and schema-level constraints of the production data represent the edges of the DAG. The constraints may include interleaved tables and foreign keys.

One technique involves topologically ordering the nodes of the DAG according to the edges connecting the nodes. This may involve a root node being ordered first, with leaf nodes following after the root node according to the determined ordering. The determined order of the graph may dictate an order for populating the randomly produced data into the test environment, which, in turn, may reduce errors, such as missing key errors, during the process.

In some example methods, data may be generated by a platform-agnostic data generator. Each node of the DAG may be associated with a different table, whereby each table may itself be associated with its own respective data type or data types and have its own respective schema-level constraints. The data generator may randomly generate data for population into a given table of the test environment and then check whether the data satisfies the data type and schema-level constraints of the given table, such as by using a satisfiability modulo theories (SMT) solver.

In order to improve efficiency of the test data generation, a plurality of independent worker nodes may be assigned to generate the data in parallel, whereby the data production is balanced among the worker nodes. This enables faster and more efficient generation of data in the test environment. The balancing may be achieved by estimating the number of bytes-per-row for each table in the production database and dividing the tables into approximately evenly distributed portions defined by respective key ranges. The number of worker nodes assigned to generate the data may be determined based on the number of rows to be generated. For instance, if the method generates N rows of random data for the test environment, then the method may involve generating sqrt(N) work units constrained according to sqrt(N) respective key ranges, with each of sqrt(N) worker nodes being assigned to a different one of the respective key ranges. Evenly splitting the data generation by splitting the key ranges across the worker nodes reduces the risk of a write contention error at any given resource, and improves the write throughput. Determining the number of rows to generate may be based on a default setting, on row count data derived from the production database, or a combination thereof.

Constraints of the production database may further be used to improve both speed of the data generation process and fidelity of the generated data. For instance, data constraints of a given table in the production database can be input to the SMT solver in order to determine feasibility of the randomly generated data more quickly for that given table. Additionally or alternatively, knowledge of the data populated in the production database may be used to further constrain the generated data beyond the schema-level constraints to yield more relevant test data, to improve split point selection for more even distribution across the respective key ranges, or both.

The methods described herein permit for population of a test environment without jeopardizing security of the corresponding production data while also not sacrificing fidelity of the test data. The methods also avoid the need to copy large amounts of data when dealing with large production databases, and provide a testing solution for unpopulated or insufficiently populated production databases. This can lead to more accurate testing, resulting in greater success of the tested service or application at release.

Example Systems

FIG. 1 illustrates an example system 100 having a production database 102, a test environment 104, and one or more computing devices 106 configured to generate test data representative of production data included in the production database 102 and to transfer the generated test data to a test environment 106 for testing. Generating test data may be useful for conducting integration testing, release testing, or both of the production database 102 on which the test data is based.

The production database 102 may be housed at one or more servers which may be located at one or more locations. Production data stored at the production database 102 may be used to support operations of one or more services or applications. For instance, the production database 102 may include multiple tables, whereby at least some of the stored tables include data accessed by or entered from the related applications or services. The tables may be related to one another according to predefined schema. For example, one table may be linked to another table according to one or more foreign keys. For further example, specific rows of one or more tables may be interleaved within the specific rows of another table. These relationships may be used to define data integrity within the database, such that an incorrect data entry may be detected and avoided or corrected within the database quickly. The test environment 106 may be capable of conducting tests on the database contents to ensure data integrity.

In the example of FIG. 1, the production database 102 is shown to include eight tables labeled Tables A-H. Unidirectional arrows between the tables illustrate foreign keys and interleaving between the tables. In the example of FIG. 1, solid arrows represent interleaving, whereby certain rows of one table are interleaved within rows of another table pointing to it. Also in the example of FIG. 1, dashed arrows represent foreign keys, whereby data entered to one table is validated based on the data included in another table pointing to it. As shown in FIG. 1, Table A is points to Tables B-H but none of Tables B-H point to Table A. In this regard, Table A may be treated as a root table, while the remaining Tables B-H may be treated as leaf tables relative to Root Table A. Additionally, Table B is a parent table to Tables D and E, Table C is a parent table to Tables E and F, Table E is a parent table to Table H, Table F is a parent table to Table H, and Table G is a parent table to Table H. The illustration is for the sake of examples, and it would be understood that a production database may include a different number of tables which may be related to one another in a different manner.

The illustration of Tables A-H in FIG. 1 is representative of a directed acyclic graph, in which each table is represented by a node and the interconnections between tables due to interleaving and foreign keys is generalized as an arrow between the interleaved tables. For the sake of simplicity, the interleaving arrows are shown between the tables, although it should be understood that the interleaving itself is between specific rows of each of the tables. Also, although not shown in FIG. 1, after test data is generated and populated in the test environment 104, the test environment may also include tables comparable to Tables A-H. Foreign keys and interleaving may also be included in the test data.

The one or more computing devices 100 for generating the test data may include one or more processors 110, servers, shards, cells, or the like. It should be understood that each computing device may include any number of processors or computing devices, and that the number of such devices in the computing devices 100 may vary over time, for example, as hardware is removed, replaced, upgraded, or expanded. The processor 110 can be a well-known processor or other lesser-known types of processors. Alternatively, the processor 110 can be a dedicated controller such as an ASIC.

The computing devices 100 may also include memory 120, and other components typically present in general purpose computers. The memory 120 can store information accessible by the processor 110, including data 130 that can be retrieved, manipulated or stored by the processor 110. The memory 120 can also include instructions 140 that can be executed by the processor 110. The memory 120 may be a type of non-transitory computer readable medium capable of storing information accessible by the processor 110, such as a hard-drive, solid state drive, tape drive, optical storage, memory card, ROM, RAM, DVD, CD-ROM, write-capable, and read-only memories.

The data 130 may include a representation of the DAG 132, which represents the production data stored in the production database 102. The DAG 132 may be represented as rows and edges, representing the multiple tables in the production database and their respective schema constraints 134, respectively. Contents of the DAG may further be represented as a sorted table, such that the root table is positioned at a top of the sorted table and leaf tables are positioned below according to the directed arrows of the DAG. Sorting the DAG into a sorted table can inform an order in which future operations for populating the test environment may be carried out. For instance, test data corresponding to production data positioned higher up of the sorted table, which is from a respective parent node of the DAG, may be generated and populated into the test environment before test data corresponding to production data positioned lower down in the sorted table, which is from a respective child node of the DAG. Populating test data in the order of the sorted table can avoid missing key errors during testing.

The data 130 may further include information about each of the respective tables of the DAG, such as a data type of the respective table, and a size of the table. The size of the table may include both a number of rows that the table includes as well as an average row size. The average row size may account for both the table itself and for data in interleaved table or other tables that act as a constraint on the table. Row size may be characterized according to bytes per row.

The data 130 may further include information for balancing the sorted table into approximately even portions. For instance, split points 136 indicating a split between the end of one section of the sorted table and the beginning of a next section of the sorted may be stored in the data 130. Use of split points 136 can permit for balanced allocation of test data generation so that approximately equal portions of test data can be generated and then written to the test environment in parallel. Maintaining a balanced division of workload for generating the test data improves an overall efficiency of the system 100.

The instructions 140 may include each of a sorted table construction routine 142 for constructing the sorted table, a sorted table partitioning routine 144 for generating the keys or split points 136 to divide the sorted table into approximately even portions, a sorted table partition assignment routine 145 for assigning the portions of the sorted table to a work pool of worker nodes, a test data generation routine 146 for randomly generating the data to be populated into the test environment, and a test data batch writing routine 148 for writing the randomly generated test data to tables in the test environment.

Figure 2:
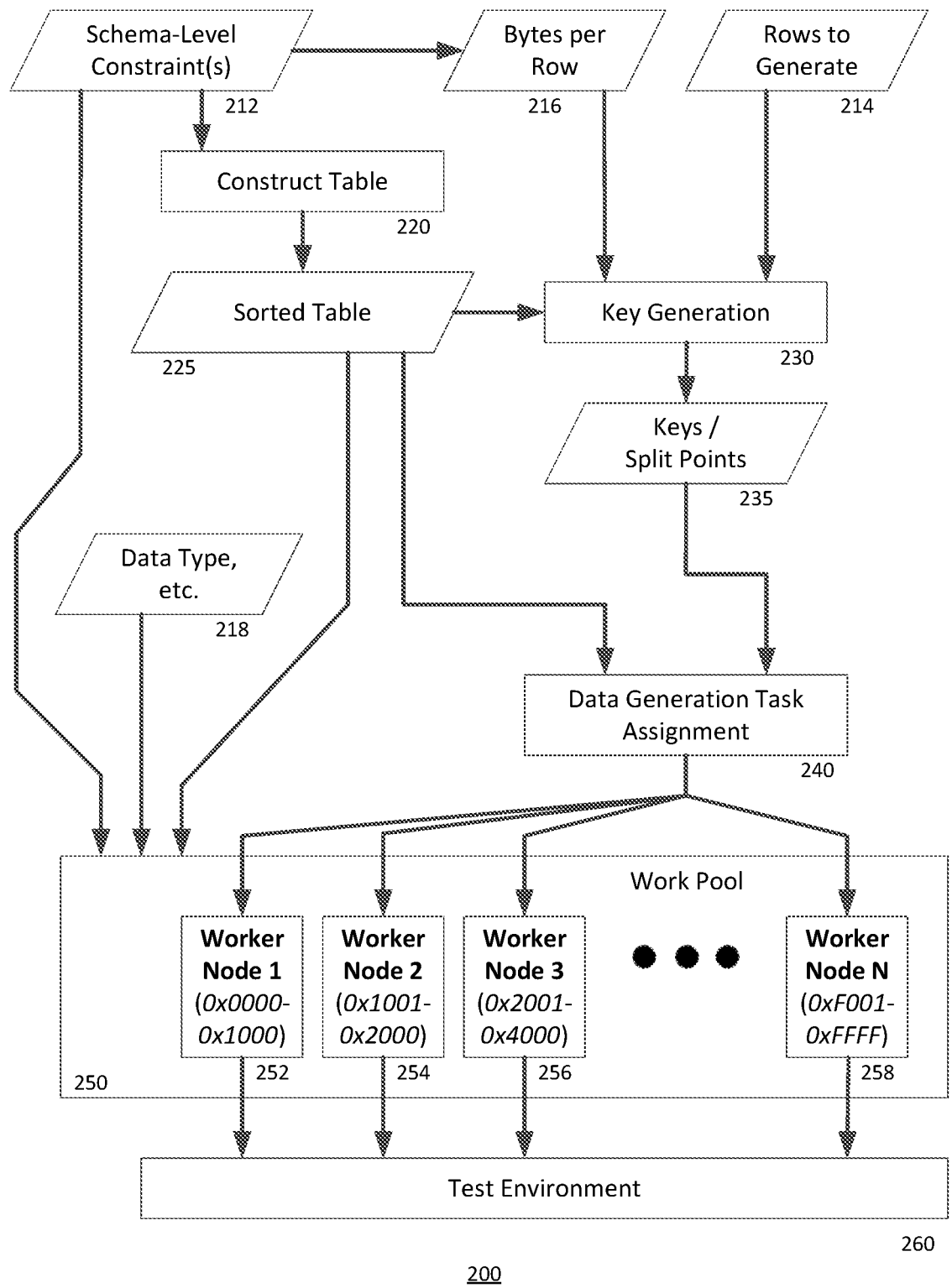
FIGS. 2 and 3 are functional block diagrams of example routines of the system of FIG. 1.
Figure 3:
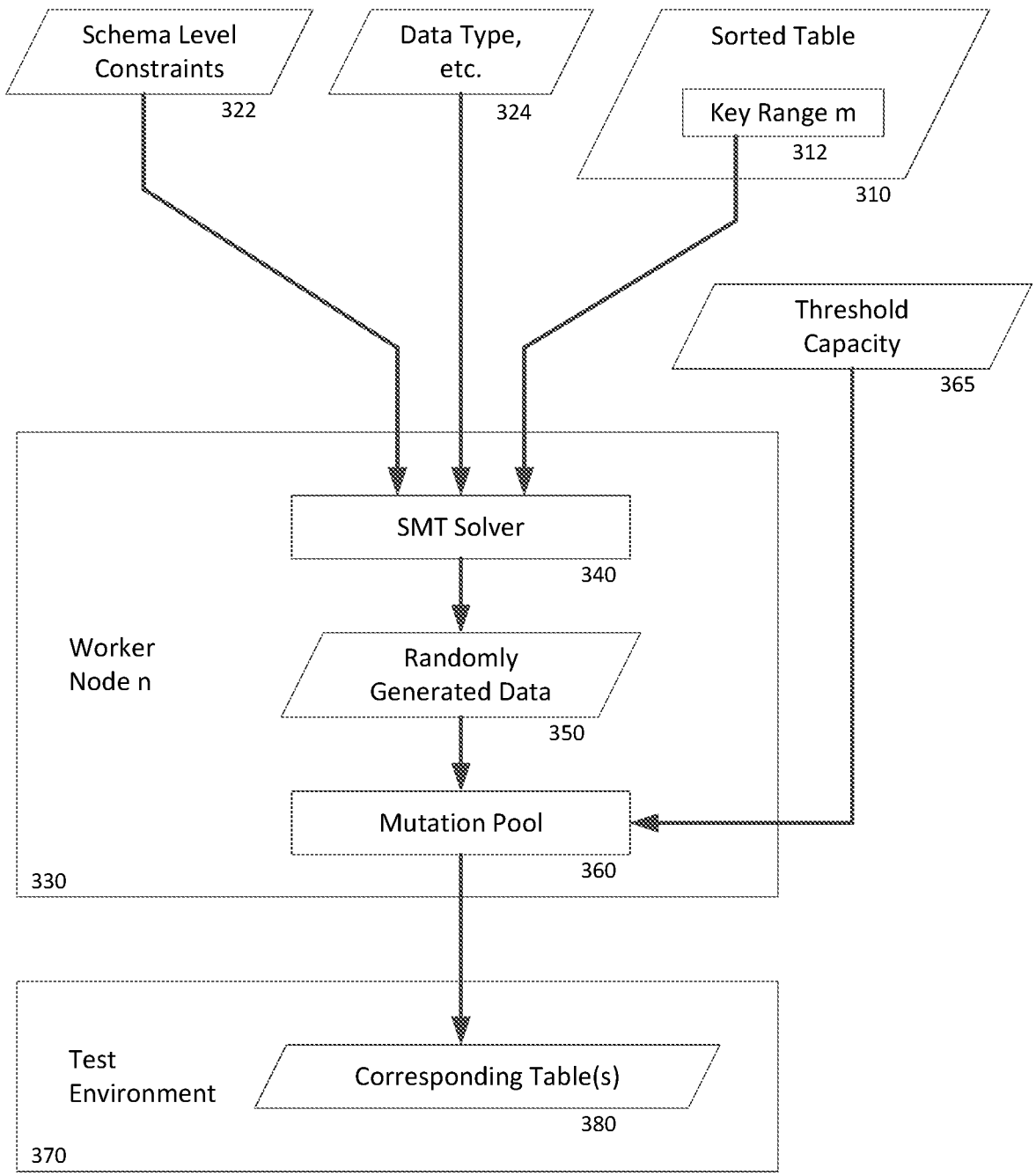

The computing devices 106 may further include input/output communication devices and protocols 150 for direct and indirect communication with the production database 102 and the test environment, as well as with other computing devices, client devices, or any combination thereof, over a communications network. The communications network may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing. For example, production data may be received from the production database 102 by the communication devices 150 for processing at the one or more computing devices 106. For further example, data received from the production database 102 may be copied and transferred to the test environment 104 by the one or more computing devices FIGS. 2 and 3 are functional block diagrams 200, 300 that illustrate aspects of the example routines included in the instructions 140 of the memory 120. For example, block 220 of FIG. 2 is an example of a sorted table construction routine 142, block 230 of FIG. 2 is an example of a sorted table partitioning routine 144, block 240 of FIG. 2 is an example of a sorted table partition assignment routine 145, block 340 of FIG. 3 is an example of a test data generation routine 146, and block 360 is an example of a test data batch writing routine 148.

Beginning in FIG. 2, table construction at block 220 may begin by receiving inputs for constructing a sorted table representative of the data included in the production database. Block 220 may receive as input the schema-level constraints 212 of the tables of the production database. The schema-level constraints 212 may indicate the tables that are included in the production database as well as the parent-child interrelationships between the tables. Such schema may include interleaving, foreign keys, or other parent-child constraints. Block 220 may provide as output a sorted table 225 in which the data of the production database is topologically sorted according to the schema-level constraints 212. Topologically sorting the production data may involve identifying a root table of the plurality of tables included in the production database, and arranging the root table to be ordered first. Other tables of the production database may be leaf tables that may follow after the root table in the topological ordering according to the schema-level constraints 212. The determined order of the sorted table may dictate an order for populating the randomly produced data into the test environment, which, in turn, may reduce errors, such as missing key errors, during the process.

The sorted table may correspond to a DAG formed based on the schema-level constraints 212 of the tables in the production database. Furthermore, data in the sorted table may assigned respective keys, such that the data can be divided or split into portions having respective non-overlapping key ranges. The boundaries between portions of the sorted tables may be defined by particular keys. The values of these keys are determined at block 230.

Key generation at block 230 is based at least in part on inputs that define a size of sorted table and a size of rows within the sorted table. The size of the sorted table may vary depending on the size of the tables included in the production database. For instance, a large database with many tables or with very large tables may correspond to a large sorted table. Since the test environment is intended to correspond to the production database, the size of the production database may also correspond to the amount of test data that is required to be generated and populated into the test environment. Thus, a large sorted table may also correspond to requiring many rows of test data to be generated, whereas a relatively smaller sorted table may corresponding to requiring fewer rows of test data to be generated. Additionally or alternatively, a number of rows to be generated in the test data may be predetermined or partially influenced by a predetermined factor.

In the example of FIG. 2, table size is characterized for each table by a number of bytes-per-row 216. The bytes-per-row 216 are in part derived from the schema-level constraints, since the size of a row in a parent table varies based on the rows of interleaved or other interrelated tables connected to it. The number of rows to be generated 214 can be either a predetermined value, a value inferred from the production database, or a combination thereof. At block 230, these inputs and the sorted table 225 are processed to return a plurality of keys or split points 235 for dividing up the sorted table 225 into approximately equal portions. In one example, an "APPROX_QUANTILES" operation nay be used to determine the key values that appropriately split the sorted table 225. In another example, a "FindBatch" operation may be used.

In some examples, the number of keys generated at block 230 may be a square root of the number of rows to be generated 214. Choosing the square root of the number of rows of test data means that for N rows of test data, M=sqrt(N). This evenly balances the number of operations that are conducted in parallel with the overall amount of test data that needs to be generated. In other examples, a different number of keys may be generated. Generating more keys will be understood to require processing more work units at a given time but yield faster results. Conversely, generating fewer keys will require processing fewer work units at a time but will take longer to yield results. Those skilled in the art may select an appropriate number of keys based on the factors of a given project, such as available time and processing.

At block 240, the sorted table 225 is assigned out to a work pool 250 of worker nodes 252-258 according to the keys or split points 235 generated at block 230. As noted herein, the number of worker nodes called at block 240 is a function of the number of keys generated at block 230, since each separate non-overlapping key range of the sorted table 225 is assigned to a different worker node 252-258. For the sake of illustration, in FIG. 2, 'Worker Node 1' 252 is assigned key range 0x000-0x1000, 'Worker Node 2' 254 is assigned key range 0x1001-0x2000, 'Worker Node 3' 256 is assigned key range 0x2001-0x4000, and 'Worker Node N' is assigned key range 0xF001-0xFFF. In some examples, each key range may correspond to a portion of data that is roughly the same size, even if the key ranges themselves are different sizes.

As shown in FIG. 2, each worker node 252-254 receives an assignment corresponding to a key range of the sorted table 225. Each worker node 252-258 may further access additional information about the tables in the production database in order to generate relevant test data for the test environment. For example, the schema-level constraints 212 associated with a given row of the sorted table may be used as a constraint to define the data generated to represent that row in the test environment.

Additionally or alternatively, information other than schema-level constraints, such as a data type of each given table in the production database, may be received and the test data generated for each row may be further constrained according to the additional information. For instance, if the data type of a given table is limited to integers, then this information can be used to limit the data generated by the worker node to integers. For further instance, if the data distribution in the tables of the production database follows a certain pattern such as a bell curve, test data may be generated to follow the same or similar pattern. Additional factors may include but are not limited to a range of values in the dataset, a number of unique elements in the dataset, foreign keys that limit valid entries of the dataset, and so on.

At block 250, the work pool generates the test data and then transmits the test data to the test environment for testing, such as integration testing, releasing testing, or other forms of testing. The generated test data may be organized into tables corresponding to the tables of the production database according to the keys assigned to the sorted table 225. The test environment 260 may further be populated with the schema-level constraints 212 defining the tables so that the production database can be properly tested in the test environment 260.

For a single example worker node n, FIG. 3 illustrates a functional flow diagram 300 of operations at the worker node 330, as well as inputs provided to the worker node and an output of the worker node 330. The worker node 330 may be capable of generating random data in order to promote randomized testing. Since completely random data may not be representative of the data received at the production database and further may cause data loading transactions to fail due to the schema-level constraints, the random data generator of the worker node 330 may use the inputs in order to narrow the test data that is generated. For example, the worker node may operate in a distributed database management service such that includes a random data generator that can be subjected to constraints of the database. One example service is Cloud Spanner, which includes a Random Data Generator that can return data for a particular data type that satisfies schema constraints such as foreign keys and a unique index. Another example data generation service is Java Faker. In the case of Java Faker, since the service is language specific, the inputs may further include additional information for handling data types and schema constraints.

In the example of FIG. 3, the worker node 330 further includes a data generator 340 which may be a platform agnostic data generator, such as a satisfiability modulo theories (SMT) solver, to check satisfiability of the randomly generated data. In some examples, the SMT solver may generate the random data itself according to the constraints of the production database. In other examples, a separate random data generator may generate the data independent of the constraints and then the SMT solver may check that the randomly generated data satisfies the constraints. In yet other examples, the system may be capable of generating random data using either the SMT solver or a separate data generator. In such examples, the system may first attempt to generate satisfactory data using the data generator, since the data generator typically yields more randomized data than the SMT solver. However, if the data generator has difficulty generating data that satisfies the constraints of the production database, such as after ten tries for a given row or work unit, data generation operations may switch to the SMT solver.

The data generator 340 receives the data 312 from the sorted table 310 within the key range m corresponding to the particular worker node. In other words, each worker node may be assigned an independent non-overlapping key range 1-M. Use of independent key ranges avoids collision issues that could otherwise arise from parallel processing of the production data. The SMT solver, which may or may not be the data generator 340, further receives the schema-level constraints 322 and other information 324 about the data 312 from the sorted table 310. These constraints may be used by the SMT solver to determine satisfiability of the generated data. If the generated data satisfies the given constraints, then it may be added to the pool of generated data 350. Otherwise, if the generated data does not pass satisfiability tests, then it may be discarded and new data may be generated. Data may continue to be generated, and then checked by the SMT solver 340, until a predetermined amount of data corresponding to the assigned key range has been generated and added to the pool of generated data 350.

The worker node 330 may transfer the generated data to a test environment 370. The test environment 370 may include a plurality of tables 380 that correspond to the tables included in the production database. The tables 380 may be arranged in the same manner as those of the production database in order to simulate the constraints of the production database. Populating the tables 380 of the test environment 370 with the generated test data 350 makes it possible to perform integration testing, release testing, or other forms of testing on the production database, whereby an error in the test environment 370 is representative of a likely error in the production database, and a lack of errors in the test environment 370 indicates that the production database is unlikely to have errors. Correspondence between the generated test data 350 and the data of the production database can be derived from the key values in the sorted table. Furthermore, each row of the sorted table is associated with a certain table or multiple tables of the production database. Therefore, each generated piece of test data can be associated to one or more tables of the production database according to the constraints used to generate the test data and the particular row or key value of the sorted table associated with those constraints.

In some examples, the generated data may be written directly to the test environment 370. However, it is more efficient to batch data for a common destination and then transfer the data together to the test environment 370 on a periodic basis. In the example of FIG. 3, a mutation pool 360 may be provided to batch the generated data 350 from the SMT solver 340. A predetermined threshold capacity value 365 for flushing the mutation pool 360 may be determined in advance of the batching, and when a new mutation-to-be-added crosses the threshold, the pool 360 may be flushed collectively. The size of a mutation may itself be approximated based on the pre-computed estimate of bytes-per-row for the production tables. Batching and then transferring the data in batches improves overall efficiency of the transfer process, especially for large data transfers.

Example Methods

Figure 4:
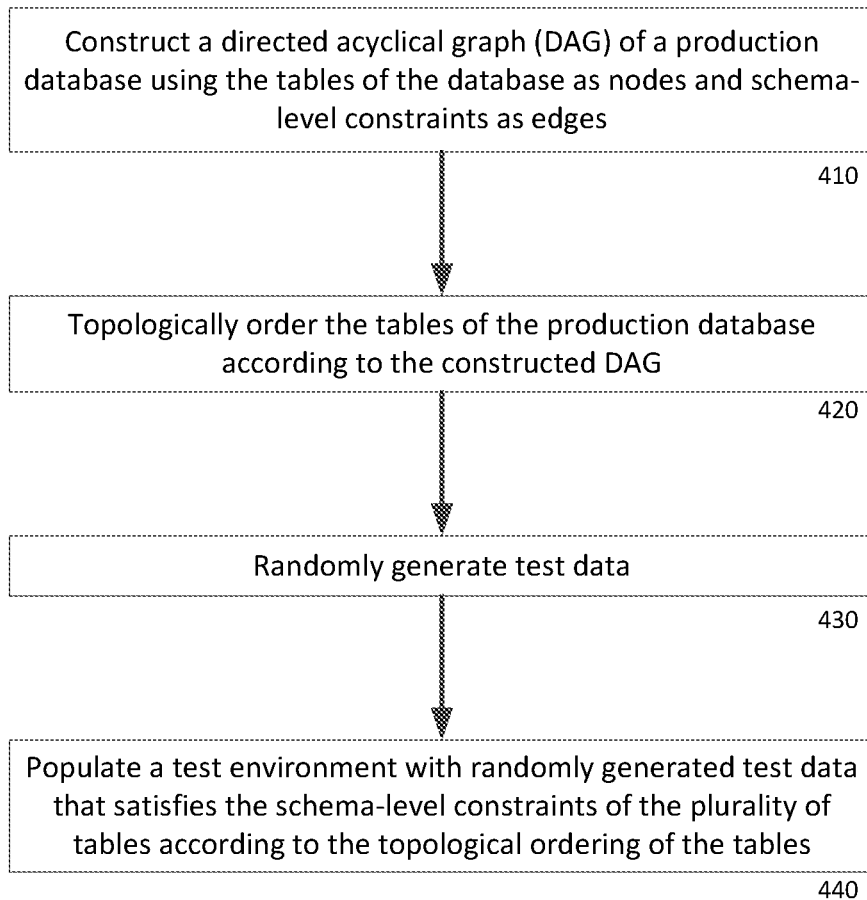
FIG. 4 is a flow diagram of an example routine in accordance with an aspect of the disclosure.

FIG. 4 is a flow diagram illustrating an example routine 400 for generating test data representative of a production database and populating the generated test data to a test environment for integration testing, release testing, or other forms of testing. The routine 400 may be executed by one or more computing devices, such as the computing devices of the example system 100 of FIG. 1. The routine 400 is meant as an example, and in other implementations of the example system 100 certain steps may be performed simultaneously, in a different order, or omitted entirely, other steps may be added, or any combination of the above.

At block 410, the one or more computing devices may construct a DAG of the production database. The tables of the production database may be represented in the DAG as nodes, and the schema-level constraints such as interleaving may be represented as edges. Schema-level constraints of the plurality of tables may include foreign keys and interleaving.

At block 420, the one or more computing devices may topologically order the tables of the production database according to the constructed DAG. The topological ordering may be based on the foreign keys, the interleaving, or both.

At block 430, the one or more computing devices may randomly generate test data. Generated test data may be checked for satisfiability with the schema-level constraints of the production database using a satisfiability modulo theories (SMT) solver. Schema-level constraints may further include unique index constraints, NOT NULL constraints, and other data-type specific properties, such as an enumeration type. The SMT solver can also check for satisfiability with other non-schema-level constraints, such as data type of a given table in the production database, dataset ranges, dataset distributions, unique elements in the dataset, and so on.

Additionally or alternatively, test data generation may be performed by multiple generators in parallel. This can be accomplished by splitting the table into a plurality of key ranges according to a plurality of key values, whereby each generated key value is a split point in the topologically ordered table representing the production database. The split topological table may then be assigned to the multiple generators in parallel. It should be recognized that for each generator to produce test data satisfying the constraints of the production database, each generator may be provided with its own SMT solver.

For the parallel data generation to be balanced and efficient, the split points may be arranged so that each key range represented an approximately equal portion of the table. Sizes of table portions can be estimated without rigorous computation based on an estimated of bytes per-row of each table in the production database, as further based on the schema-level constraints applicable to each row of the topologically ordered table.

Additionally or alternatively, the number of generators to which data is assigned may be determined based on available resources, a size of the workload, or both. In one case, a number of rows of test data to be generated may be determined, and the number of generators selected for assignment may be based on the number of rows, such as selecting a square root of the number of rows.

At block 440, the one or more computing devices may populate a test environment with the randomly generated test data. Test environment population may be dictated according to the topological ordering of the tables in order to avoid data loading errors. In some instances, transferring the randomly generated test data to the test environment may be done in batches by writing the test data to mutation pools associated with given tables of the test environment. Then, when the size of a transaction of the mutation pool's contents to the given table of the test environment meets or exceeds a threshold transaction value, the mutation pool may be flushed.

The above example systems and methods may be implemented in various data production environments that support constraints that interrelate tables of the production database to one another in an acyclical manner, such as interleaving and foreign keys. For example, the systems and methods may be implemented in a distributed database management and storage service, such as a Spanner database. Additionally, services such as Spanner that allow users to divide and prioritize jobs, as opposed to sending all jobs to a single queue, provide users with more control over the data generation operations and can reduce the likelihood of generated test data becoming clogged, such as may happen in a common queue.

The example systems and methods further provide increased security compared to systems that copy production data to the test environment. The example systems and methods are also not limited by the size of available data in the production database, since the generated test data can exceed the available production data. This can be valuable for testing newly or recently released productions that have not yet been fully populated. Conversely, if the production database has too much data, less data may be generated. In summary, a current state of the production database does not affect an efficiency of test environment population, regardless of the amount of data in the production database.

The example systems and methods further enable the use of randomized data for integration testing. This can be further advantageous for discovering unforeseen errors that would not otherwise be discovered using the data populated in the production database. For instance, generated test data may be more likely to include every permitted data type than the production database, meaning that the generated test data may be more likely to detect an error caused by a data type that is not yet included in the production database, such as unicode or a special character.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of populating a test environment for testing of a production database comprising a plurality of tables, the method comprising:
    constructing, by one or more processors, a directed acyclic graph (DAG), wherein each of the plurality of tables is represented by a respective node of the DAG and schema-level constraints of the plurality of tables are represented by edges of the DAG;
    topologically ordering, by the one or more processors, the plurality of tables of the production database into a sorted table according to the DAG;
    dividing, by the one or more processors, the sorted table into a plurality of portions based on table size information about the plurality of tables;
    assigning, by the one or more processors, each of the portions of the sorted table to a respective one of a plurality of data generators;
    instructing, by the one or more processors, the plurality of data generators to randomly generate test data in parallel; and
    populating, by the one or more processors, the randomly generated test data when it satisfies the schema-level constraints of the plurality of tables to the test environment according to the topological ordering of the plurality of tables.

2. The method of claim 1, wherein the schema-level constraints of the plurality of tables include both foreign keys and interleaving, and wherein the topological ordering is based on both the foreign keys and the interleaving.

3. The method of claim 1, wherein the test data is generated by one or more data generators, each including a satisfiability modulo theories (SMT) solver for determining, for a given table of the plurality of tables, whether the randomly generated data satisfies a data type and the schema-level constraints of the given table.

4. The method of claim 3, wherein the plurality of data generators are a plurality of independent platform agnostic data generators.

5. The method of claim 4, further comprising:
for each table of the plurality of tables, splitting, by the one or more processors, the table into a plurality of key ranges according to a plurality of key values, wherein each key value is a split point;
generating, by the one or more processors, a work pool comprising a plurality of work units, each work unit associated with a respective table of the plurality of tables and a respective key range of the plurality of key ranges; and
assigning, by the one or more processors, the plurality of work units to the plurality of data generators.

6. The method of claim 5, wherein the splitting the table into a plurality of key ranges comprises:
for each table of the plurality of tables, estimating, by the one or more processors, a number of bytes-per-row of the table; and
determining, by the one or more processors, a balanced distribution of data across the plurality of key ranges based on a number of rows to generate and the estimated number of bytes-per-row of each table.

7. The method of claim 5, further comprising:
determining, by the one or more processors, an amount of data to populate each table of the test environment with; and
determining, by the one or more processors, a number of the plurality of key values based at least in part on the determined amount of data.

8. The method of claim 1, further comprising:
for a given table of the plurality of tables, determining, by the one or more processors, one or more data constraints based on data contained in the given table; and
constraining, by the one or more processors, the randomly generated test data for a corresponding table of the test environment based on the one or more data constraints.

9. The method of claim 8, wherein the one or more data constraints includes at least one of: a dataset range; a dataset distribution; and a number of unique dataset elements.

10. The method of claim 1, further comprising:
writing the randomly generated test data to a mutation pool associated with a given table of the test environment; and
in response to a size of a transaction of the mutation pool's contents to the given table of the test environment meeting or exceeding a threshold transaction value, flushing the mutation pool.

11. The method of claim 1, wherein the plurality of portions have sizes generated according to an approximation function.

12. A system for populating a test environment for testing a production database comprising a plurality of tables, the system comprising:
memory storing a representation of a directed acyclic graph (DAG), wherein each of the plurality of tables is represented by a respective node of the DAG and schema-level constraints of the plurality of tables are represented by edges of the DAG; and
one or more processors configured to:
topologically order the plurality of tables of the production database into a sorted table according to the DAG;
divide the sorted table into a plurality of portions based on table size information about the plurality of tables;
assign each of the portions of the sorted table to a respective one of a plurality of data generators
instruct the plurality of data generators to randomly generate test data in parallel in accordance with the schema-level constraints of the plurality of tables; and
populate the randomly generated test data to the test environment according to the topological ordering of the plurality of tables.

13. The system of claim 12, wherein the schema-level constraints of the plurality of tables include both foreign keys and interleaving, and wherein the one or more processors are configured to topologically order the plurality of tables based on both the foreign keys and the interleaving.

14. The system of claim 13, wherein the one or more processors are configured to randomly generate the test data using a plurality of SMT solvers operating in parallel.

15. The system of claim 14, wherein the one or more processors are configured to:
for each table of the plurality of tables, split the table into a plurality of key ranges according to a plurality of key values, wherein each key value is a split point;
generate a work pool comprising a plurality of work units, each work unit associated with a respective table of the plurality of tables and a respective key range of the plurality of key ranges; and
assign the plurality of work units to the plurality of data generators.

16. The system of claim 15, wherein the one or more processors are configured to:
for each table of the plurality of tables, estimate a number of bytes-per-row of the table; and
determine a balanced distribution of data across the plurality of key ranges based on a number of rows to generate and the estimated number of bytes-per-row of each table.

17. The system of claim 15, wherein the one or more processors are configured to:
determine an amount of data to populate each table of the test environment with; and
determine a number of the plurality of key values based at least in part on the determined amount of data.

18. The system of claim 12, wherein the one or more processors are configured to generate the test data using a satisfiability modulo theories (SMT) solver for determining, for a given table of the plurality of tables, whether the randomly generated data satisfies a data type and the schema-level constraints of the given table.

19. The system of claim 12, wherein the one or more processors are configured to:
for a given table of the plurality of tables, determine one or more data constraints based on data contained in the given table; and
constrain the randomly generated test data for a corresponding table of the test environment based on the one or more data constraints.

20. The system of claim 12, wherein the one or more processors are configured to:
write the randomly generated test data to a mutation pool associated with a given table of the test environment; and in response to a size of a transaction of the mutation pool's contents to the given table of the test environment meeting or exceeding a threshold transaction value, flush the mutation pool.

21. The system of claim 12, wherein the production database is a Spanner database.

22. The system of claim 12, wherein the plurality of portions have sizes generated according to an approximation function.

* * * * *